(12) United States Patent
Dice

(10) Patent No.: US 6,697,834 B1
(45) Date of Patent: Feb. 24, 2004

(54) MUTUAL EXCULSION SYSTEM AND METHOD FOR RESTARTING CRITICAL SECTIONS OF CODE WHEN PREEMPTED DURING A CRITICAL SECTION

(75) Inventor: David A. Dice, Foxboro, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/452,571

(22) Filed: Dec. 1, 1999

(51) Int. Cl.[7] .................................................. G06F 9/00

(52) U.S. Cl. ...................... 709/102; 709/100; 709/107; 709/108

(58) Field of Search ......................... 710/260; 709/100, 709/102, 107, 108

(56) References Cited

U.S. PATENT DOCUMENTS 4,908,750 A * 3/1990 Jablow ....................... 709/103
RE36,462 E * 12/1999 Chang et al. ............... 711/209

OTHER PUBLICATIONS

Bershad, Brian et al. "Fast Mutual Exclusion for Uniprocessors," ACM SIGPLAN Notices: vol. 27, Issue 9 (Sep. 1992).*

* cited by examiner

*Primary Examiner*—David Wiley
*Assistant Examiner*—Joseph E Avellino
(74) *Attorney, Agent, or Firm*—Chapin & Huang, LLC; Barry W. Chapin, Esq.

(57) ABSTRACT

A mutual exclusion arrangement is disclosed for use in connection with a computer, the computer being configured to execute at least one program having at least one thread in a series of time slots. The mutual exclusion arrangement includes, associated with the computer, a signal generator and, associated with the at least one thread, a signal handler. The signal generator is configured to generate a signal for provision to the at least one thread when the computer initiates processing of the at least one thread in one of the time slots. The signal handler is configured to, in response to the signal, determine whether the thread, when it begins execution in the time slot, will be executing a section of code that is to be executed in an atomic manner, and, if so, enable the thread to begin execution at a beginning of the section, and otherwise enable the thread to begin execution subsequent to previously-executed code.

15 Claims, 4 Drawing Sheets

MICROPROCESSOR 20

MUTUAL EXCULSION SYSTEM AND METHOD FOR RESTARTING CRITICAL SECTIONS OF CODE WHEN PREEMPTED DURING A CRITICAL SECTION

FIELD OF THE INVENTION

The invention relates generally to the field of digital computer systems, and more particularly to systems and methods for facilitating the synchronization of access to variables and other resources which may be shared among a plurality of threads of execution in a digital computer system.

BACKGROUND OF THE INVENTION

Computers process programs in one or more threads. In a computer having a plurality of processors, a plurality of threads can be executed in parallel, with each processor executing a thread. If there are more threads than the number of processors, at least one of the processors will execute a plurality of threads generally in an interleaved basis in a plurality of successive time slots. In a uni-processor computer, that is, a computer having a single processor, the processor will also execute the threads generally in an interleaved basis in a plurality of time slots.

Typically in multi-threaded programs, a thread will use a mutual exclusion mechanisms to avoid interference from and data race conditions with other threads. As an example of the utility of a mutual exclusion mechanism, consider code along the lines of Code Segment 1, which depicts code for a thread comprising a routine "getTicket" in which the value of a variable "Ticket" is incremented:

Code Segment 1

```
(1)        Tock$getTicket
(2)             save %sp, -64, %sp        !! routine enter
(3)   prolog
(4)        ld   [%i0].ObjectLock, %10     !! get lock variable
(5)        call mutex_enter                !! begin synchronization
(6)        mov  %10, %o0
(7)        ld   [%i0].Ticket, %o0         !! load variable "Ticket"
(8)        add  %o0, 1, %o0               !! increment variable "Ticket"
(9)        st   %o0, [%i0].Ticket         !! store variable "Ticket"
(10)       call mutex_exit                 !! end synchronization
(11)       mov  %10, %o0
(12)       ret                             !! routine exit
(13)  epilog
(14)       restore
```

In Code Segment 1, the code is illustratively in the SPARC instruction set (reference SPARC International, Inc [David L. Weaver and Tom Germond (eds)], The SPARC Architecture Manual Version 9 (Prentice-Hall, 1994)).

In Code Segment 1, the getTicket routine includes a "critical section" comprising lines (7) through (9) which are to be executed as an atomic "read-modify-write" operation to enable the value of the variable "Ticket" to be incremented. To ensure that the operation is performed in an atomic manner, without variable "Ticket" being accessed by another thread before the one thread has finished executing the critical section, the getTicket routine makes use of a "mutex" ("mutual exclusion") mechanism to synchronize access to the variable "Ticket." The mutual exclusion mechanism ensures that, while the thread which includes the getTicket routine is executing the routine, only that thread will be able to access and perform operations in connection with the variable Ticket. In particular, line (5) ("call mutex-enter") initiates the synchronization and line (10) ("call mutex_exit") terminates synchronization. The code in both of these lines represent calls to the operating system, which locks the variable "Ticket" for the thread which includes the getTicket routine in response to the mutex_enter call, and unlocks the variable "Ticket," making it available to other threads, in response to the mutex_exit call. After the variable "Ticket" has been locked in response to the mutex_enter call, and before the variable "Ticket" is unlocked in response to the mutex_exit call, the getTicket routine enables the variable "Ticket" to be retrieved from the computer's memory and loaded into one of the processor's internal registers (line 7), incremented (line 8) and stored back into the computer's memory (line (9)).

The benefit of the synchronization will be clear from the following. If, for example, the thread's time slot ends after the variable "Ticket" has been retrieved from the memory and loaded into an internal register, and before the value as incremented by the getTicket routine has been stored in the memory, another thread retrieves the variable "Ticket," increments its value by some amount and stores the value as incremented by that thread in the memory, when the thread (that is, the thread executing the getTicket routine) stores the value as incremented by it in the memory, it will over-write the value as stored by the other thread. Accordingly, the value of the variable "Ticket" as retrieved by the other thread will correspond to the original, non-incremented value, instead of the incremented value which presumably was the value that the other thread was to have processed. More important, however, is that, since the thread that is executing the getTicket routine has over-written the value as stored by the other thread, the value as processed by the other thread will not be reflected in subsequent processing operations. However, by synchronizing access to the variable "Ticket," the thread which executes the getTicket routine can forbid the other thread from accessing the variable "Ticket" until after the value has been retrieved, incremented and stored in the memory, even if those operations occur in different time slots. This may delay operations by the other thread, since the other thread will need to wait until after the thread that is executing the getTicket routine has finished operating with the variable and ended synchronization, but it will ensure that the processing operations take place in the correct order.

However, use of synchronization primitives such as the "mutex_enter" and "mutex_exit" themselves incur some cost. Since the synchronization primitives require calls to the operating system kernel, they can result in relatively long processing times. U.S. patent application Ser. No. 09/174,278, filed Oct. 16, 1998, in the name of David Dice, et al., and entitled System And Method For Synchronizing Access To Shared Variables In A Virtual Machine In A Digital Computer System, and assigned to the assignee of the current convention, describes a wait-free synchronization arrangement for facilitating synchronization by enabling one thread to use a compare and swap instruction to detect when the value of a variable which may be accessed by multiple processes or threads has been changed by another thread while the one thread has been executing a critical section. While that arrangement can facilitate synchronization, it will be appreciated at one such compare and swap instruction will be used each variable requiring synchronization during execution of the critical section, and, if multiple variables require synchronization, then a corresponding number of compare and swap instruction will be used.

SUMMARY OF THE INVENTION

The invention provides a new and improved system and method for facilitating the synchronization of access to variables and other resources which may be shared among a plurality of threads of execution in a digital computer system.

In brief summary, the invention provides, in one embodiment, a mutual exclusion arrangement for use in connection with a computer. The computer is configured to execute at least one program having at least one thread in a series of time slots. The mutual exclusion arrangement includes, associated with the computer, a signal generator and, associated with the at least one thread, a signal handler. The signal generator is configured to generate a signal for provision to the at least one thread when the computer initiates processing of the at least one thread in one of the time slots. The signal handler is configured to, in response to the signal, determine whether the thread, when it begins execution in the time slot, will be executing a section of code that is to be executed in an atomic manner, and, if so, enable the thread to begin execution at a beginning of the section, and otherwise enable the thread to begin execution subsequent to previously-executed code.

The arrangement effectively provides a form of mutual exclusion, similar to that provided by the synchronization primitives such as mutex_enter and mutex_exit, for atomic operations associated with critical sections of a thread. However, instead of doing so in an active manner, by forbidding access to a variable by other threads in the manner accomplished by conventional synchronization primitives, the present arrangement essentially allows a thread which is executing a critical section which makes use of the variable to determine when an event has occurred which may make the variable accessible to other threads. A variable can be accessed by other threads if the time slot of the thread that includes the critical section terminates while the thread is executing the critical section. By notifying the thread, when it resumes execution, that execution of the thread has been pre-empted, the thread can thereafter perform whatever operations it deems necessary on the assumption that the variable in fact had been accessed. Thus, the invention provides an arrangement by which the thread can detect and recover from an event which can expose the variable to being processed by another thread, as distinguished from using conventional synchronization primitives, which require relatively lengthy calls to the operating system to ensure that another thread will not access.

In addition, the arrangement does not require the use of compare-and-swap instructions, which provide fine-grained synchronization for each of the variables which may be used in a critical section.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
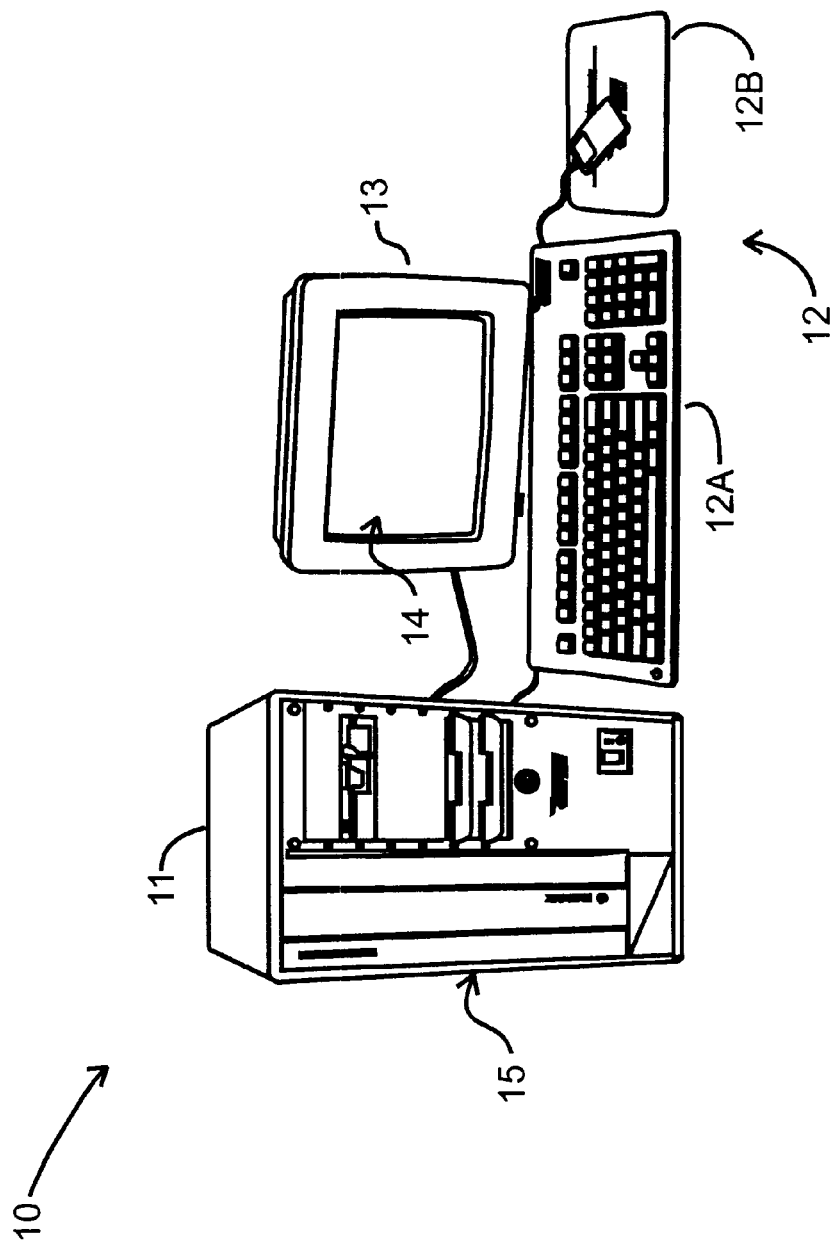
FIG. 1 is a depicts an illustrative digital computer system including an arrangement for synchronizing access to variables and other resources which may be shared among a plurality of threads of execution, constructed in accordance with the invention.

FIG. 1 depicts an illustrative computer system 10 including an arrangement for synchronizing access to variables and other resources which may be shared among a plurality of threads of execution, constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and operator output components such as a video display device 13. The illustrative computer system 10 is of the conventional stored-program computer architecture.

The processor module 11 includes, for example, processor, memory and mass storage devices such as disk and/or tape storage elements (not separately shown) which perform processing and storage operations in connection with digital data provided thereto. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the processor, information stored in the mass storage subsystems may be transferred to the memory for storage. After the information is stored in the memory, the processor may retrieve it from the memory for processing. After the processed data is generated, the processor may also enable the mass storage subsystems to retrieve the processed data from the memory for relatively long-term storage.

The operator input element(s) 12 are provided to permit an operator to input information for processing and/or control of the digital computer system 10. The video display device 13 is provided to, respectively, display visual output information on a screen 14, which i generated by the processor module 11, which may include data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 may include one or more network or communication ports, generally identified by reference numeral 15, which can be connected to communication links to connect the computer system 10 in a computer network, or to other computer systems (not shown) over, for example, the public telephony system. The ports enable the computer system 10 to transmit information to, and receive information from, other computer systems and other devices in the network.

The invention provides an arrangement, which will be described below in connection with FIG. 2, for synchronizing access to variables which may be accessed by a plurality of threads, when one of the threads is using the variable in a critical section. The arrangement in connection with the invention can result in reduced processing times in relation to use of conventional synchronization primitives, such as the "mutex_enter" and "mutex_exit" primitives as described above, which may require relatively long processing times. In addition, the arrangement can provide an advantage in that it does not require the use of compare-and-swap instructions, which provide fine-grained synchronization for each of the variables which may be used in a critical section.

Figure 2:
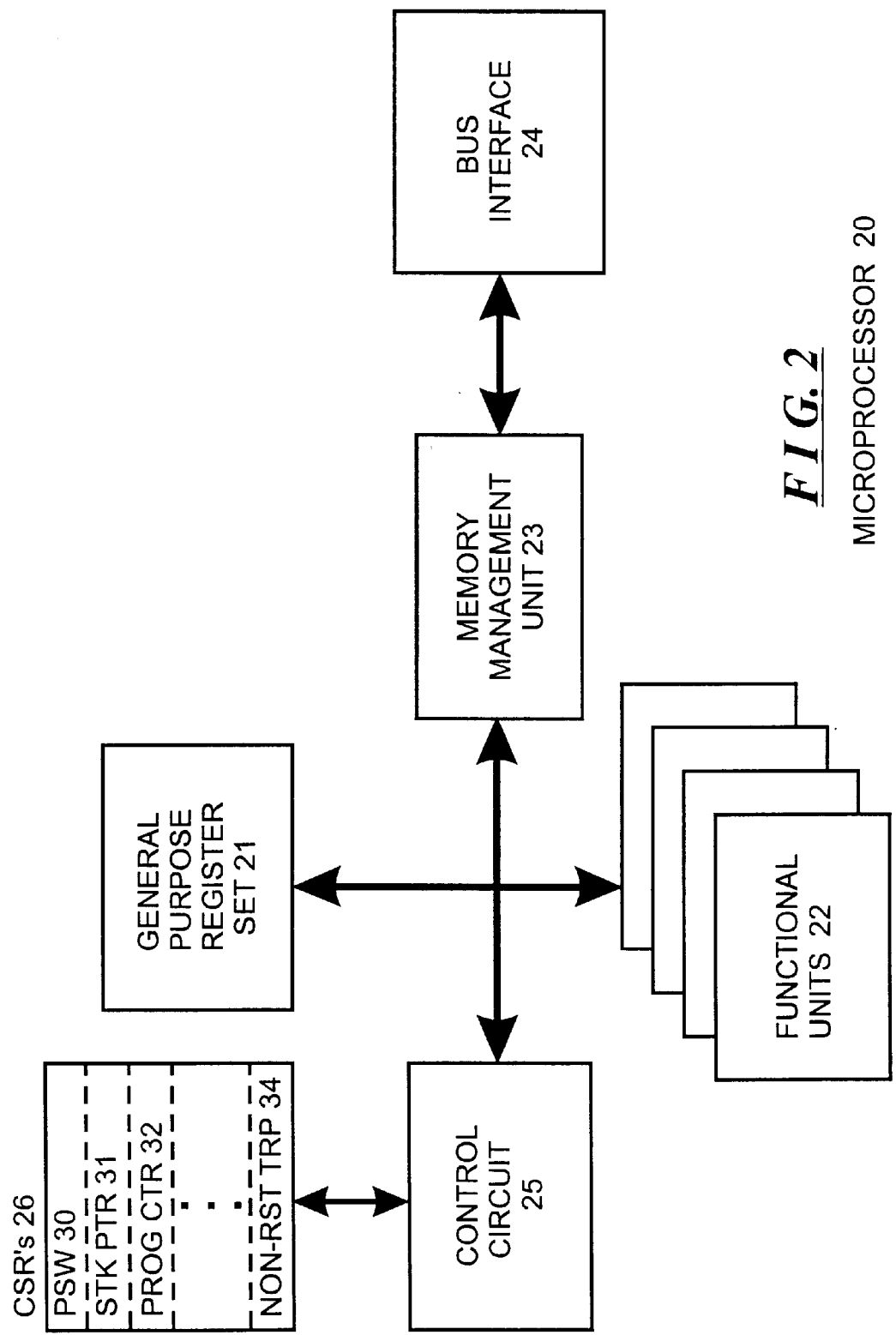
FIG. 2 is a functional block diagram of an arrangement constructed in accordance with the invention.

FIG. 2 depicts a functional block diagram of a microprocessor 20 useful in computer 10. With reference to FIG. 2, microprocessor 20 includes a number of elements, including a register set 21, one or more functional units 22, a memory management unit 23, a bus interface 24, a control circuit 25 and a set of control and status registers 26. The bus interface 24 connects to a bus (not shown), which, in turn, connects to the memory, input/output subsystems and the like (also not shown) which are provided in the computer 10. The control circuit 25 controls the processing operations as performed by the microprocessor 20 under control of instructions provided by a program. Generally, under control of the control circuit 25, the memory management unit 23, cooperating with the bus interface 24, retrieves instructions and data from the computer's memory or data storage elements maintained by particular input/output subsystems for processing and loads the retrieved data into registers in the register set 21. Also under control of the control circuit 25, the functional units 22 perform logical, integer and floating point arithmetic, and other processing operations in connection with data which the control circuit 25 enables to be transferred thereto from the register set 21, to generate processed data which will be transferred to the register set 21 for storage. The control circuit 25 may also enable the memory management unit 23, also cooperating with the bus interface 24, to transfer processed data from the register set 21 to the memory or data storage elements maintained by particular input/output subsystems for storage.

In connection with performing its operations as described above, the control circuit makes use of various ones of the control and status registers 26. The control and status registers 26 include a number of registers, including, as is conventional, a processor status word register 30, a stack pointer register 31, a program counter register 32, and so forth. These registers store control and status information for use in processing the program being executed. In addition, the control and status registers 26 include a non-restorable trap indicator 34, whose use will be described below. Generally, the microprocessor 20 processes instructions from a program, with the instructions being organized in a plurality of threads. The microprocessor 20 processes the threads comprising the program in an interleaved manner in successive time slots. While the microprocessor 20 is processing a thread, the registers in the register set 21, and the control and status registers 26 will contain information for processing of the particular thread being processed. Generally, at the end of a time slot, the microprocessor 20, under control of the operating system (not shown) controlling the microprocessor, will pre-empt the thread, that is, it will stop it from executing and save the contents of the registers in the general purpose register set 21 and the control and status registers 26 in the computer's memory. Thereafter, the microprocessor 20 will select another thread to be executed, and, if the selected thread had previously been executed, retrieve from the memory information which the microprocessor 20 had saved for the thread the last time the thread had been executed, store the retrieved information in the appropriate registers in register set 21 and control and status registers 26, thereby to restore the state of the selected thread as it was at the end of the selected thread's last time slot. In addition, the microprocessor 20 will enable the selected thread to resume executing. If the selected thread had not been executed previously, the microprocessor 20 can initialize the registers in a conventional manner and enable the selected thread to be processed. Similar operations, which are generally transparent or invisible to the threads, will occur at the end of each time slot.

As noted above, in accordance with the invention, the control and status registers 26 include a non-restorable trap indicator 34. When the microprocessor 20 restores the state of the selected thread, it checks the non-restorable trap indicator 34. If the microprocessor 20 determines that the non-restorable trap indicator 34 is set, the operating system will trap and the trap handler which processes the trap will enable a signal to be delivered to the selected thread.

The selected thread will also have a signal handler which, when it receives the signal, will thereby be made aware of the fact that its execution by the microprocessor 20 had been pre-empted, and it can take whatever corrective measures are deemed necessary. The thread itself can control the state of the non-restorable trap indicator 34 to enable itself to be signaled by the trap handler if its execution is pre-empted for any reason for which it may wish to know that it has been pre-empted. For example, if the thread had been executing a routine such, as the getTicket routine described above in connection with Code Segment 1, which includes a critical section to be executed in an atomic manner, the selected thread can set the non-restorable trap indicator 34 when it enters the critical section, and clear it when it leaves the critical section. Accordingly, when the selected thread resumes executing, the thread's signal handler can enable the thread to resume executing at the beginning of the critical section. The thread can clear the non-restorable trap indicator 34, for example, when it leaves the critical section. This will ensure that, if the amount of time required to execute the critical section is no greater than the duration of the time slot in which the critical section is executed, the critical section can be executed in an atomic manner. Thus, the thread can execute the critical section of Code Segment 1 without the necessity of using the synchronization primitives, such as the mutex_enter and mutex_exit calls described above in connection with Code Segment 1. Since, as noted above, the synchronization primitives require calls to the operating system, which can take a relatively long time to complete, by reducing the necessity of using such calls, the invention facilitates more efficient thread execution. Further, this can be done without requiring instructions such as the compare and swap instructions described above, to determine whether each of what may be a plurality of variables which may be accessed by other threads, has in fact been accessed by another thread, before determining whether to re-start the critical section. Essentially, the present arrangement assumes that a variable in a critical section which other threads can access in fact have accessed the variable while the thread which contains the critical section was pre-empted, and restarts execution of the critical section.

It will be appreciated that the invention effectively provides a form of mutual exclusion, similar to that provided by the synchronization primitives such as mutex_enter and mutex_exit, for atomic operations, but instead of doing so in an active manner, by forbidding access to a variable by other threads in the manner accomplished by conventional synchronization primitives, essentially allows a thread which is executing a critical section which makes use of the variable to determine when an event has occurred which may make the variable accessible to other threads. As noted above, the variable can be accessed by other threads if execution of the time slot of the thread that includes the critical section terminates while the thread is executing the critical section. By notifying the thread when it resumes execution, the thread can thereafter perform whatever operations it deems necessary on the assumption that the variable in fact had been accessed. Thus, the invention provides an arrangement by which the thread can detect and recover from an event which can expose the variable to being processed by another thread, as distinguished from use of conventional synchronization primitives, which require relatively lengthy calls to the operating system to ensure that another thread will not access the variable.

Figure 3:
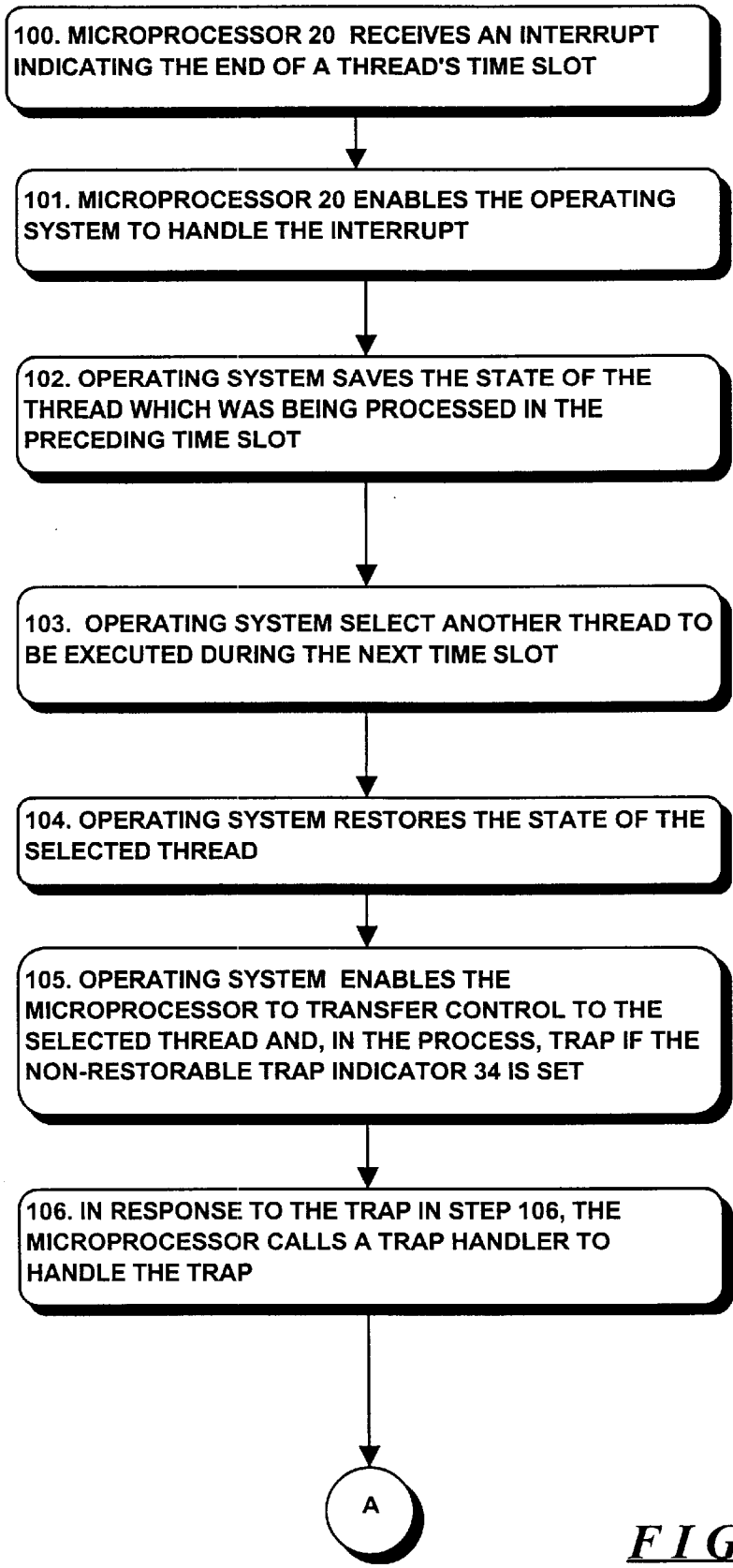
FIGS. 3 and 3A is a flow diagram depicting operations performed in connection with the invention.
Figure 3A:
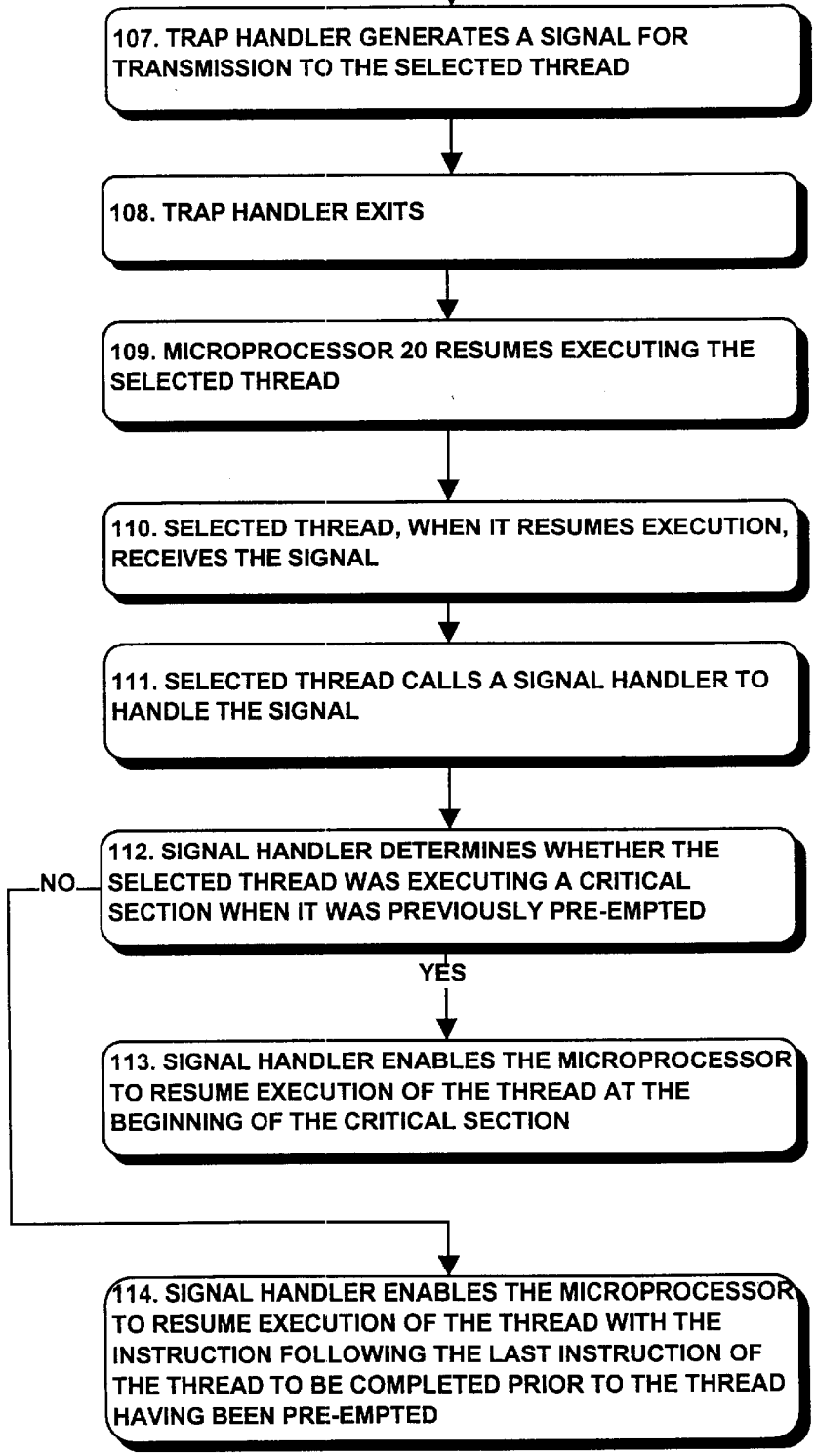

Operations performed by the computer 10 in connection with the invention will be described in connection with the flow chart in FIG. 3. With reference to FIG. 3, when the microprocessor 20 receives an interrupt indicating the end of a thread's time slot (step 100), the microprocessor 20 enables the operating system to handle the interrupt (step 101). In processing the interrupt, the operating system will save the state of the thread which was being processed in the preceding time slot (step 102), select another thread to be executed during the next time slot (step 103), and restore the state of the selected thread (step 104). As noted above, in step 102, when saving the state of the thread which was being processed in the preceding time slot, the operating system will save the contents of the registers in register set 21 and the registers in the control and status registers 26 in the computer's memory. Similarly, in step 104, when restoring the state of the selected thread, the operating system will retrieve the contents of the registers in register set 21 and the registers in the control and status registers 26 as previously-saved in the computer's memory and store them in the respective registers.

After the operating system has restored the state of the selected thread (step 104), the operating system will enable the microprocessor to, in turn, transfer control to the selected thread and, in the process, trap if the non-restorable trap indicator 34 is set (step 105).

In response to the trap in step 105, the microprocessor calls a trap handler to handle the trap (step 106). The trap handler, in turn, generates a signal for transmission to the selected thread (step 107) and exits (step 108). Thereafter, the microprocessor resumes executing the selected thread (step 109).

The selected thread, when it resumes execution, receives the signal generated in step 107 (step 110) and calls a signal handler to handle the signal (step 111). The signal indicates to the selected thread that its execution had been pre-empted, and so the signal handler performs predetermined operations in connection therewith. As noted above, in those operations, the signal handler, which forms part of the selected thread, can, for example, determine whether the selected thread was executing a critical section when it was previously pre-empted (step 112), and, if so, enable the microprocessor to resume execution of the thread at the beginning of the critical section (step 113). On the other hand, if the selected thread's signal handler determines that the selected thread was not executing a critical section when it was previously pre-empted, the signal handler may enable the microprocessor to resume execution of the thread with the instruction following the last instruction of the thread to be completed prior to the thread having been pre-empted (step 114).

The invention provides a number of advantages. In particular, the invention provides an arrangement by which the thread can detect and recover from an event which can expose the variable to being processed by another thread, as distinguished from use of conventional synchronization primitives, which require relatively lengthy calls to the operating system to ensure that another thread will not access, and as further distinguished from use of synchronization methodologies such as that described above which make use of a compare and swap instruction to detect when a variable that the thread uses in a critical section of code has been modified by another thread while the one thread is executing the critical section. The arrangement assumes that, when a thread that is executing a critical section is pre-empted, it is likely that, if other threads have access to one or more variables in the critical section, it is likely that has occurred, and so it restarts execution of the critical section.

It will be appreciated that the arrangement described above finds utility primarily in connection with a uniprocessor computer, that is, a computer on which all of the threads which may access a variable are executed by a single processor. This follows from the fact that the arrangement addresses the possibility that a variable used in a critical section may be accessed by another thread when the one thread is pre-empted during processing of a critical section. The arrangement may also be used in connection with a computer which may have multiple processors, if all of the threads of a program are processed by a single processor, and if the variable(s) used in the critical sections are not shared among programs or processes.

As noted above, the arrangement will find utility primarily in connection with critical sections for which execution time is somewhat less than the duration of a time slot. If, for a critical section, the time required to execute the critical section is greater than duration of the time slot, clearly the critical section would not complete execution, even if execution of the critical section started at the beginning of a time slot. Similarly, as the time required to execute the critical section approaches the duration of the time slot, the likelihood that the critical section would not complete execution increases. Accordingly, a thread which includes a critical section and which wishes to make use of the arrangement can, if pre-empted during one attempt to execute the critical section, either make use of the compare and swap mechanism or conventional synchronization primitives (illustratively, the mutex_enter and mutex_exit calls) at a later time.

Although the invention has been described with the microprocessor 20 being provided with an indicator, in particular the non-restorable trap indicator 34, for indicating to the operating system that the thread wishes to be notified that it has been pre-empted, it will be appreciated that other mechanisms may be used. Generally, the indicator for indicating the non-restorable state should be accessible to the thread, with the microprocessor 20 operating in so-called "user" mode, instead of just to the operating system, which the microprocessor 20 will typically execute in a more privileged "kernel" mode. For example:

(i) Microprocessors constructed according to the i386 architecture defined by Intel Corporation have an alignment check flag for enabling a trap to occur to allow the thread to executed with the stack pointer (reference register 31) misaligned. The operating system will set the alignment check flag when it preempts one thread and prepares to allow another thread to be executed. In response to the trap, the trap handler can enable the processor to send a signal to the thread.

(ii) Microprocessors constructed according to the i386 architecture defined by Intel Corporation have a nested task flag. The operating system will set the nested task flag when it preempts one thread and prepares to allow another thread to be executed. In response to the trap, the trap handler can enable the microprocessor to send a signal to the thread.

(iii) On microprocessors constructed according to the SPARC architecture defined by SPARC International, intentionally misaligning the stack pointer as stored in the stack pointer register (reference register 31) will enable the operating system kernel to generate a misalignment fault when attempting to transfer information between a series of registers in the register set 21 and a stack associated with the thread. The fault handler called to handle the misalignment can enable the microprocessor to send a signal to the thread.

(iv) Microprocessors construct according to the i386 architecture defined by Intel Corporation have a local descriptor table (LDT), which can be used to provide a non-restorable state indication. If, for example, the LDT descriptor associated with the current code segment (CS) is marked invalid, the microprocessor's code segment descriptor cache would be stale with respect to the LDT in memory. The thread can continue to run normally in this condition, but if the thread is preempted, when the operating system later attempts to resume execution of the thread, the instruction that is used to return from the operating system to the thread will detect the invalid descriptor and trap. In response to the trap, a signal is provided to the thread.

Other arrangements will be apparent to those skilled in the art.

In addition, although the arrangement has been described as providing a signal to the thread after the thread has been pre-empted in response to an indication that the thread wishes to be provided with such a signal, it will be appreciated that such a signal may be provided to the thread whenever the thread has been pre-empted.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A mutual exclusion arrangement for use in connection with a computer, the computer being configured to execute at least one program having at least one thread in a series of time slots, the mutual exclusion arrangement comprising:

A. associated with said computer, an operating system including a signal generator configured to generate a signal, in response to detection of a non-restorable trap indicator being set by the at least one thread, for provision to said at least one thread when the computer initiates processing of said at least one thread in one of said time slots, the signal generator including:

the non-restorable trap indicator having a set condition and a clear condition, a control module configured to, in response to the end of a time slot, enable the at least one thread to resume execution, the control module being further configured to, before enabling the at least one thread to resume execution, test the condition of the non-restorable trap indicator and, if it is in the set condition, trap, and a trap handler configured to, in response to a trap by said control module, generate said signal; and B. associated with said at least one thread, a signal handler configured to, in response to said signal, determine whether the thread, when it begins execution in the time slot, will be executing a section of code that is to be executed in an atomic manner, and, if so, enable the thread to begin execution at a beginning of said section, and otherwise enable said thread to begin execution subsequent to previously-executed code.

2. A mutual exclusion arrangement as defined in claim 1 in which said program has a plurality of threads, the computer being configures to execute said threads in said time slots in an interleaved manner.

3. A mutual exclusion arrangement as defined in claim 2 in which the computer is configured to execute said threads in at most one series of time slots.

4. A mutual exclusion method of use in connection with a computer, the computer being configured to execute at least one program having at least one thread in a series of time slots, the mutual exclusion method comprising the steps of:

A. enabling said computer to generate a signal, in response to detection, by an operating system of the computer, of a non-restorable trap indicator being set, by the at least one thread, for provision to said at least one thread when the computer initiates processing of said at least one thread in one of said time slots;

B. enabling, by the at least one thread, said computer to condition the non-restorable trap indicator to a set condition;

C. before enabling the at last one thread to resume execution, test the condition of the non-restorable trap indicator, by the operating system of the computer, and, if it is in the set condition, trap;

D. in response to the trap, generate said signal;

E. following a return from said trap, transfer control to said at least one thread;

F. enabling said at least one thread to, in response to said signal, determine whether the thread, when it begins execution in the time slot, will be executing a section of code that is to be executed in an atomic manner, and, if so, begin execution at a beginning of said section, and otherwise begin execution subsequent to previously-executed code.

5. A mutual exclusion method as defined in claim 4 in which said program has a plurality of threads, the computer being enabled to execute said threads in said time slots in an interleaved manner.

6. A mutual exclusion method as defined in claim 5 in which the computer is configured to execute said threads in at most one series of time slots.

7. A computer program product for use in connection with a computer to provide a mutual exclusion arrangement, the computer being configures to execute at least one program having at least one thread in a series of time slots, the computer program product comprising a machine readable medium having encoded thereon:

A. for association in connection with said computer, an operating system having a signal generator module configured to enable said computer to generate a signal, in response to detection of a non-restorable trap indicator being set by the at least one thread, for provision to said at least one thread when the computer initiates processing of said at least one thread in one of said time slots, the signal generator module including:
the non-restorable trap indicator module having a set condition and a clear condition,
a control module configured to enable said computer to, in response to the end of a time slot, enable the at least on thread to resume execution, the control module being further configured to enable said computer to, before enabling the at least one thread to resume execution, test the condition of the non-restorable trap indicator and, if it is in the set condition, trap,
a trap handler module configured to enable said computer to, in response to a trap by said control module, generate said signal; and B. for association in connection with said at least one thread, a signal handler module configured enable said computer, in response to said signal, to determine whether the thread, when it begins execution in the time slot, will be executing a section of code that is to be executed in an atomic manner, and, if so, enable the thread to begin execution at a beginning of said section, and otherwise enable said thread to begin execution subsequent to previously-executed code.

8. A computer program product as defined in claim 7 in which said program has a plurality of threads, the computer being configured to execute said threads in said time slots in an interleaved manner.

9. A computer program product as defined in claim 8 in which the computer is configured to execute said threads in at most one series of time slots.

10. In a thread processed by a computer having an operating system separate from the thread, a method for recovering from a preemption comprising:

in a first time slot:
setting a state of a non-restorable trap indicator while executing, and
experiencing a preemption, provided by the operating system, while executing; and
in a second time slot:
receiving a signal from the operating system in response to detection, by the operating system, of the non-restorable trap indicator being set by the thread in the first-time slot, the signal indicating preemption of execution of the thread in the first time slot,
in response to receiving the signal, detecting if the preemption, experienced by the thread, occurred during execution of a critical section,
when detecting that the preemption, experienced by the thread, occurred during execution of a critical section, enabling the computer to resume execution of the thread at the beginning of the critical section, and
when detecting that the preemption, experienced by the thread, occurred during execution of a non-critical section, enabling the computer to resume execution of the thread at the last instruction completed prior to the preemption.

11. The method of claim 10 wherein the step of receiving further comprises calling a signal handler to handle the signal and wherein the step of detecting comprises detecting, by the signal handler, if the preemption, experienced by the thread, occurred during execution of a critical section.

12. In a computer having an operating system and a thread, separate from the operating system, a method for preempting and resuming execution of the thread comprising:

in a first time slot
executing the thread;
receiving, from the thread, setting of a non-restorable trap indicator associated with the computer;
receiving an interrupt indicating an end to the first time slot;
preempting execution of the thread in response to receiving the interrupt; and
in a second time-slot:
detecting setting of the non-restorable trap indicator by the thread in the first time slot;
transmitting a signal to the thread indicating preemption of execution of the thread in the first time slot;
resuming execution of the thread at the beginning of the critical section in response to the thread detecting, based upon the signal, that the preemption, experienced by the thread, occurred during execution of a critical section, and
resuming execution of the thread at the last instruction completed prior to the preemption in response to the thread detecting, based upon the signal, that the preemption, experienced by the thread, occurred during execution of a non-critical section.

13. The method of claim 12 wherein the step of preempting comprises, saving, by the operating system, a state of the thread within a memory associated with the computer.

14. The method of claim 12 further comprises:
trapping, by the operating system, in response detecting setting of the non-restorable trap indicator by the thread; and
calling a trap handler, by the computer, to generate a signal to the thread indicating preemption of execution of the thread in the first time slot.

15. A computerized device comprising:
at least one communications interface;
a processor; and
an interconnection mechanism coupling the at least one communications interface and the processor;
wherein the processor is configured to:
in a first time slot
execute a thread;
receive, from the thread, setting of a non-restorable trap indicator associated with the computer;
receive an interrupt indicating an end to the first time slot;
preempt execution of the thread in response to receiving the interrupt; and in a second time slot:
  detect setting of the non-restorable trap indicator by the thread in the first time slot;
  transmit a signal to the thread indicating preemption of execution of the thread in the first time slot;
  resume execution of the thread at the beginning of the critical section in response to the thread detecting, based upon the signal, that the preemption, experienced by the thread, occurred during execution of a critical section, and resume execution of the thread at the last instruction completed prior to the preemption in response to the thread detecting, based upon the signal, that the preemption, experienced by the thread, occurred during execution of a non-critical section.

* * * * *

UNITED STATES PATENT AND TRADEMARK OFFICE
CERTIFICATE OF CORRECTION

PATENT NO. : 6,697,834 B1
DATED : February 24, 2004
INVENTOR(S) : David A. Dice

It is certified that error appears in the above-identified patent and that said Letters Patent is hereby corrected as shown below:

Column 11,
Line 63, "in the first-time slot," should read -- in the first time slot --

Column 12,
Line 28, "in a second time-slot:" should read -- in a second time slot --

Signed and Sealed this

Twentieth Day of July, 2004

JON W. DUDAS
*Acting Director of the United States Patent and Trademark Office*